United States Patent
Emigh (10) Patent No.: US 8,910,044 B1
(45) Date of Patent: Dec. 9, 2014

(54) PLAYLIST INCORPORATING TAGS

(76) Inventor: Aaron T. Emigh, Incline Village, NV (US)

(*) Notice: Subject to any disclaimer, the term of this patent is extended or adjusted under 35 U.S.C. 154(b) by 914 days.

(21) Appl. No.: 11/895,153

(22) Filed: Aug. 22, 2007

Related U.S. Application Data (60) Provisional application No. 60/839,216, filed on Aug. 22, 2006.

(51) Int. Cl.
*G06F 3/00* (2006.01)
*H04N 5/445* (2011.01)

(52) U.S. Cl.
CPC .............................. *H04N 5/44543* (2013.01)
USPC ......................................................... 715/716

(58) Field of Classification Search
CPC .......................... H04N 5/44543; G11B 27/002
USPC .................. 715/716; 369/30.04, 30.06, 30.08
See application file for complete search history.

(56) References Cited

U.S. PATENT DOCUMENTS

| | | | |
|---|---|---|---|
| 7,472,353 B1* | 12/2008 | Wolff et al. | 715/764 |
| 2001/0026287 A1* | 10/2001 | Watanabe | 345/764 |
| 2004/0244046 A1* | 12/2004 | Champion | 725/112 |
| 2005/0114374 A1* | 5/2005 | Juszkiewicz et al. | 707/101 |
| 2006/0287916 A1* | 12/2006 | Starr et al. | 705/14 |
| 2007/0156410 A1* | 7/2007 | Stohr et al. | 704/275 |

OTHER PUBLICATIONS

Kroski, Ellyssa, "The Hive Mind: Folksonomies and User-Based Tagging", Dec. 2005 (http://infotangle.blogsome.com/2005/12/07/the-hive-mind-folksonomies-and-user-based-tagging/).*

* cited by examiner

*Primary Examiner* — Haoshian Shih (57) ABSTRACT

In some embodiments, techniques for processing a playlist may include receiving a tag, associating the tag with a playlist, receiving a selection associated with the playlist, determining a media element associated with the tag; and processing (e.g. playing or synchronizing) the media element. In some embodiments, techniques for processing a playlist may include receiving a tag, associating the tag with a media element, receiving a selection associated with a playlist associated with the tag; and processing (e.g. playing or synchronizing) the media element.

20 Claims, 5 Drawing Sheets

FIG. 5

PLAYLIST INCORPORATING TAGS

CROSS REFERENCE TO RELATED APPLICATIONS

This application claims priority to U.S. Provisional Patent Application No. 60/839,216, entitled INFORMATION PROCESSING, filed Aug. 22, 2006, which is incorporated herein by reference for all purposes.

FIELD OF THE INVENTION

The present invention relates generally to the area of media categorization, processing and playback. More specifically, tag-based techniques for processing playlists associated with media elements such as audio and video are disclosed.

BACKGROUND OF THE INVENTION

Media players of various types have proliferated, aided by the wide availability and increasingly low cost of high-density memories and processing power. Both dedicated media players and general-purpose computing devices, as well as hybrid devices such as playback-capable cellular telephones, are commonly used to organize and play media content such as music and videos. It is often convenient to organize such content into playlists, which permit specification of a set of media elements to be played or synchronized and in some cases an order in which to play them.

User-created tags are an increasingly popular way to organize assets such as email, web pages and photos. Tagging allows users to organize their content in ways that make sense to the user, without requiring a fixed structure or taxonomy.

Current technologies provide for playlist generation and maintenance on the basis of adding individual media elements or elements based on an associated artist, album, etc. However, they do not provide for using tags when creating or maintaining playlists. This restricts users from being able to use convenient, personalized and unstructured organizational tools for their playlists, resulting in difficulty and wasted time.

Accordingly, it would be useful to be able to create and maintain playlists including the use of user-generated tags.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
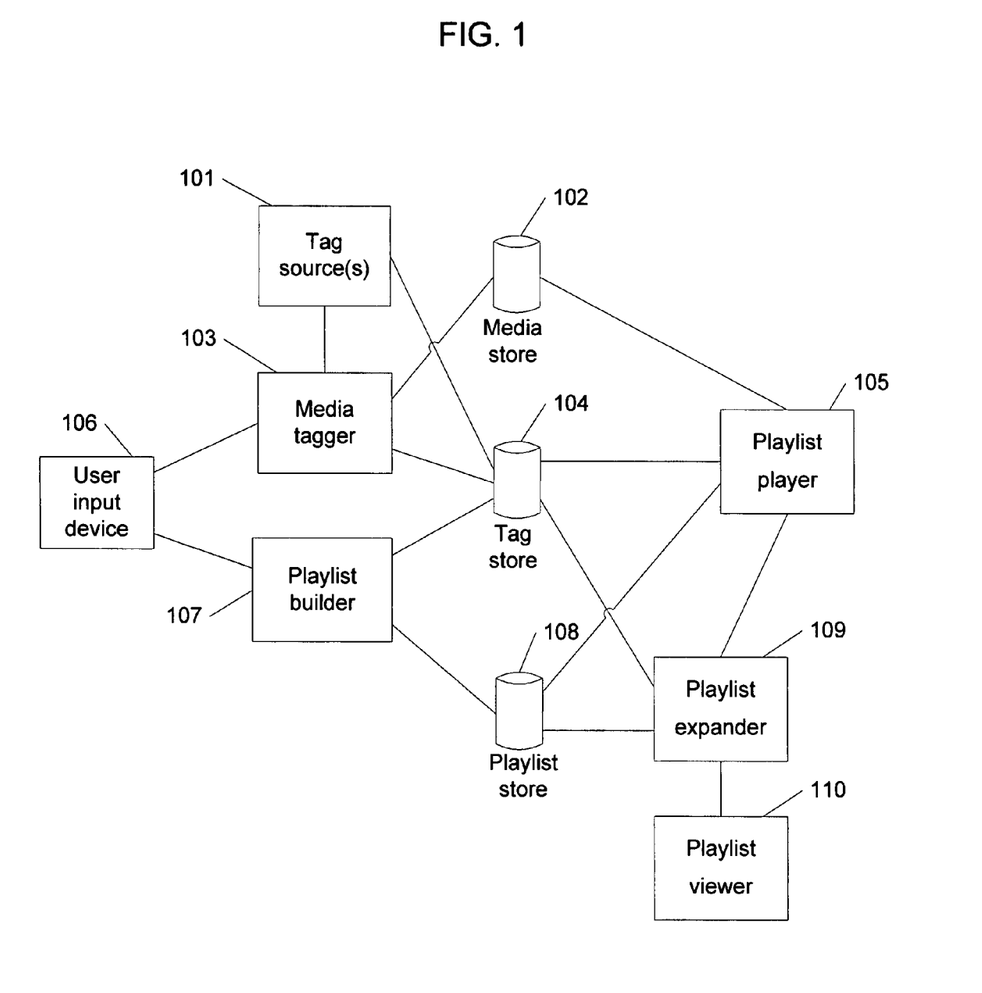
FIG. 1 is a diagram of a system for building, displaying and/or playing playlists incorporating tags, according to some embodiments.

FIG. 1 is a diagram of a system for building, displaying and/or playing playlists incorporating tags, according to some embodiments. A playlist refers herein to a grouping of digital media elements, such as songs or videos, enabling playback of the elements. When a playlist is viewed or played, media elements may be fully ordered, or may be partially ordered, or may be unordered (for example played in an arbitrary order, or in a pseudorandomly generated order, from among the playlist).

In this example, one or more tag sources 101 and/or a user input device 106 may provide one or more tags to a media tagger 103. An example of a tag source 101 is a network-accessible service that provides user-created tags via a network interface, for example from a social tagging service in which user tags for media elements can be shared among users of the service. Another example of a tag service 101 is a synchronization service which acquires tags associated with media elements. Examples of a user input device 106 include a keyboard, a mouse, a touchpad, a touch-sensitive screen, and a microphone associated with voice recognition software.

A tag refers herein to a string of characters, such as an alphanumeric string, which has been or can be associated by a user with a user-visible element such as a playlist or media element. An example of a tag is a string entered (e.g. typed in) by an user and associated with an element. Another example of a tag is a string selected by an end-user to associate with an element, for example from a suggestion interface such as a tag cloud or completion list. Another example of a tag is a selection by a user of a term extracted from content (for example using a term extraction algorithm known to those skilled in the art, such as TFIDF) and associated with the content. In some embodiments, a tag may have been originated at some point in its history by a user. An example of a tag originating at some point in history by a user is immediate origination, such as receiving a tag entry or selection. Another example of a tag originating at some point in history by a user is receiving a tag from a social tagging service that had previously been originated by a user. In some embodiments, a tag association may be specific to one user. In some embodiments, a tag association may be shared between users, e.g. in a folksonomy. Examples of tagging and folksonomies are discussed in Ellyssa Kroski, "The Hive Mind: Folksonomies and User-Based Tagging," available via the internet at http://infotangle.blogsome.com/2005/12/07/the-hive-mind-folksonomies-and-user-based-tagging/.

Media tagger 103 associates zero or more tags with one or more media elements stored in a media store 102. Examples of a media store 102 include one or more files on a filesystem, and a database such as a relational database, and a combination of a filesystem and a relational database, for example in which data in a relational database maps media element identifiers to media elements stored in a filesystem. In some embodiments, a media store 102 may be or include an in-memory data structure such as an array, list, binary tree, or hash table. In some embodiments, a such an in-memory data structure may be read from and written to persistent storage such as a database or file.

Tags and mappings between tags and media elements are stored in a tag store 104. Examples of a tag store 104 include one or more files on a filesystem, and a relational database, for example including a table mapping tags to identifiers and a table mapping tag identifiers to media element identifiers. In some embodiments, a tag store 104 may be or include an in-memory data structure such as an array, list, binary tree, or hash table. In some embodiments, a such an in-memory data structure may be read from and written to persistent storage such as a database or file.

A playlist builder 107 receives input from user interface device 106, and constructs and/or modifies playlists stored in playlist store 108 using tag store 104. Examples of a playlist store 108 include one or more files on a filesystem, and a relational database, for example in which playlist names and/or identifiers are mapped to one or more media elements and/or tags. In some embodiments, a playlist store 108 may be or include an in-memory data structure such as an array, list, binary tree, or hash table. In some embodiments, such an in-memory data structure may be read from and written to persistent storage such as a database or file.

In various embodiments, media store 102, tag store 104 and/or playlist store 108 may be associated with different physical or logical databases, or one or more of them may be associated with the same physical or logical database, for example as separate tables within a database. In various embodiments, media store 102, tag store 104 and/or playlist store 108 may be associated with persistent storage such as magnetic storage or flash memory, and/or ephemeral storage such as DRAM.

A playlist player 105 may play media elements associated with media store 102, as specified in playlist store 108. A playlist expander 109 may expand one or more symbolic elements in a playlist from playlist store 108, such as tags or tag identifiers associated with tag store 104, into its constituent media elements, for example by generating a list of media element identifiers. Playlist expander 109 may provide such an expanded playlist to playlist player 105 and/or playlist viewer 110.

Playlist viewer 110 may provide a view of a playlist associated with playlist store 108. In some embodiments, playlist viewer 110 may provide facilities for editing a playlist, for example as described in conjunction with playlist builder 107. As shown in this Figure, playlist viewer 110 communicates with playlist store 108 and tag store 107 through playlist expander 109. In other embodiments, it may communicate with them directly.

In some embodiments, the system of this FIG. 1 may be associated with a computer or portable media device such as an MP3 player, video player, iPod, or cellular phone with incorporated media playing capabilities.

Additional details of the operation of the system of this FIG. 1 are discussed in conjunction with the remaining Figures.

Figure 2:
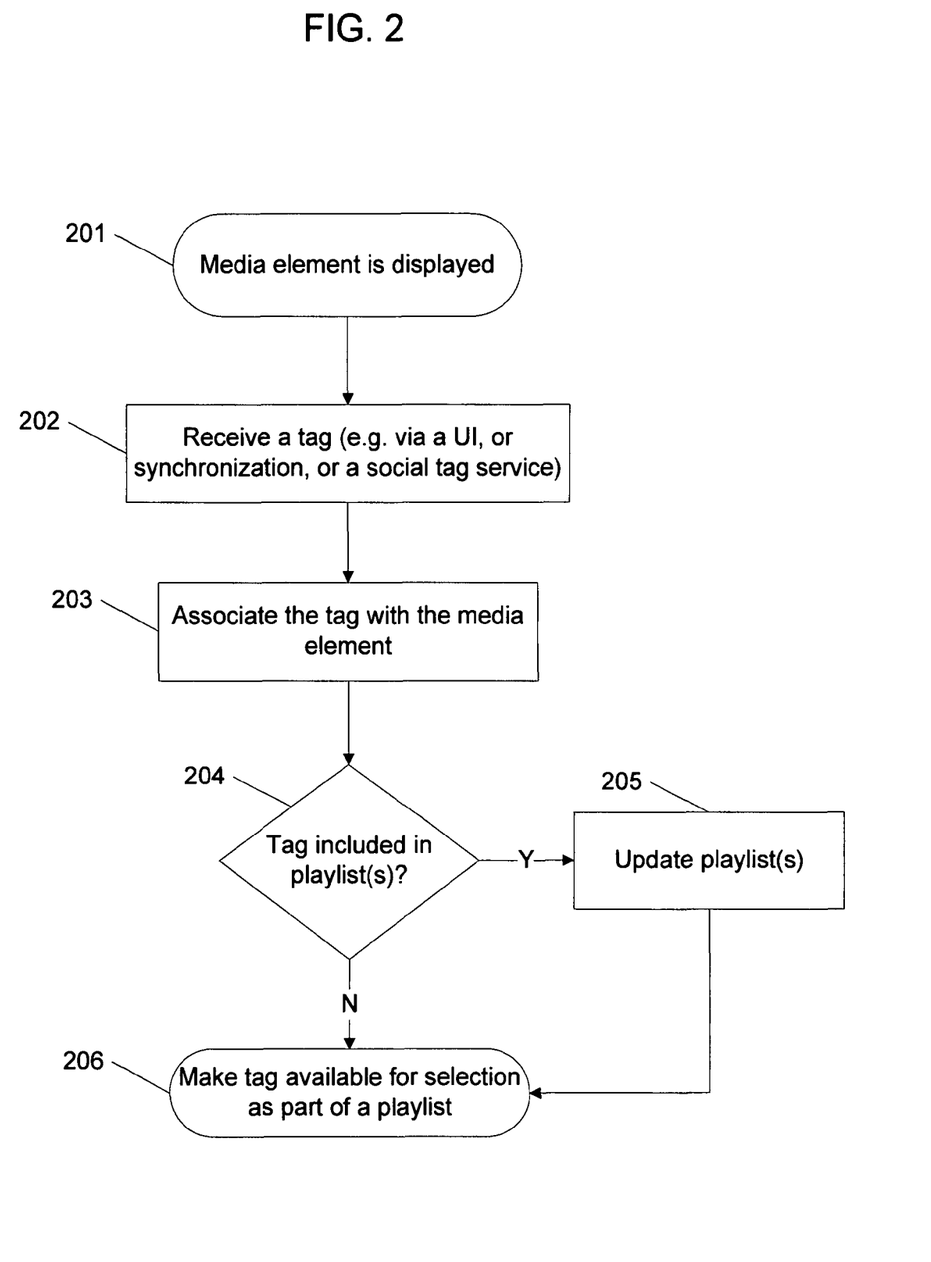
FIG. 2 is a flow diagram of a method for processing a tag entry, according to some embodiments.

FIG. 2 is a flow diagram of a method for processing a tag entry, according to some embodiments. In this example, a media element is displayed (201). An example of displaying a media element is to display information relating to the media element, such as the media element itself or associated metadata such as a title, artist, comment, etc. on a user interface such as a screen. Another example of displaying a media element is to transmit information related to the media element, such as transmitting HTML at a web server. In various embodiments, a media element may be displayed in conjunction with a view of media elements such as a playlist view, a view of a library of media elements, a view of a single media element, and/or a view specific to tag entry.

A tag may be received (202). One example of receiving a tag is to receive it via a user interface element enabling a user to type in a tag name, such as a textbox. Another example of receiving a tag is to receive it via a user interface element enabling a user to select a tag name, such as a combo box or an autocomplete facility associated with a user interface element such as a textbox, which may for example present available, previously used and/or popular tags for selection. Another example of receiving a tag is to receive it as audio input and apply voice recognition. Another example of receiving a tag is to receive it as metadata associated with a song being synchronized with another device such as a computer, PDA, phone or media player, or as a primary element being synchronized with such a device. Another example of receiving a tag is to receive it from a tag source such as tag source 101 of FIG. 1. Receiving a tag may be associated with a directive to associate the tag with the media element, either explicitly (e.g. via a user interface that explicitly or implicitly states such an association) or implicitly, e.g. by receiving a tag from a tag source.

The tag may be associated with the media element (203), for example by associating an identifier associated with the tag with an identifier associated with the media element in a tag store such as tag store 104 of FIG. 1.

It may be determined whether the tag is included in one or more playlists (204). If it is determined that the tag is associated with a playlist (204), then in this example the playlist is updated (205) for each such playlist. An example of updating the playlist is to add the media element to the playlist. In some embodiments, for example in which a tag and not individual content elements relating to the tag is associated with a playlist, such an update may be performed implicitly, i.e. an update of affected content elements may not be explicitly performed. In some embodiments, such an update may include a request to the user to select a play order for the media element. In some embodiments, a play order may be determined automatically (for example according to an ordering rule already in effect for the playlist) or may not be associated with the playlist and/or the media element.

In some embodiments, a tag may correspond to a playlist. For example, a playlist may be implicitly created when a media element is associated with a tag that has not previously been used, and a playlist may be altered by adding a media element when the media element is tagged, and/or removing a media element when a tag is removed from the media element. In such cases, it may always be determined that a tag is associated with at least one playlist (204).

If it is determined that the tag is not included in a playlist (204), or after updating one or more playlists (205), then in this example the tag is made available for selection as part of a playlist (206) if it is not already (for example if this is the first use of the tag). An example of selecting a tag as part of a playlist is discussed in conjunction with FIG. 3.

Figure 3:
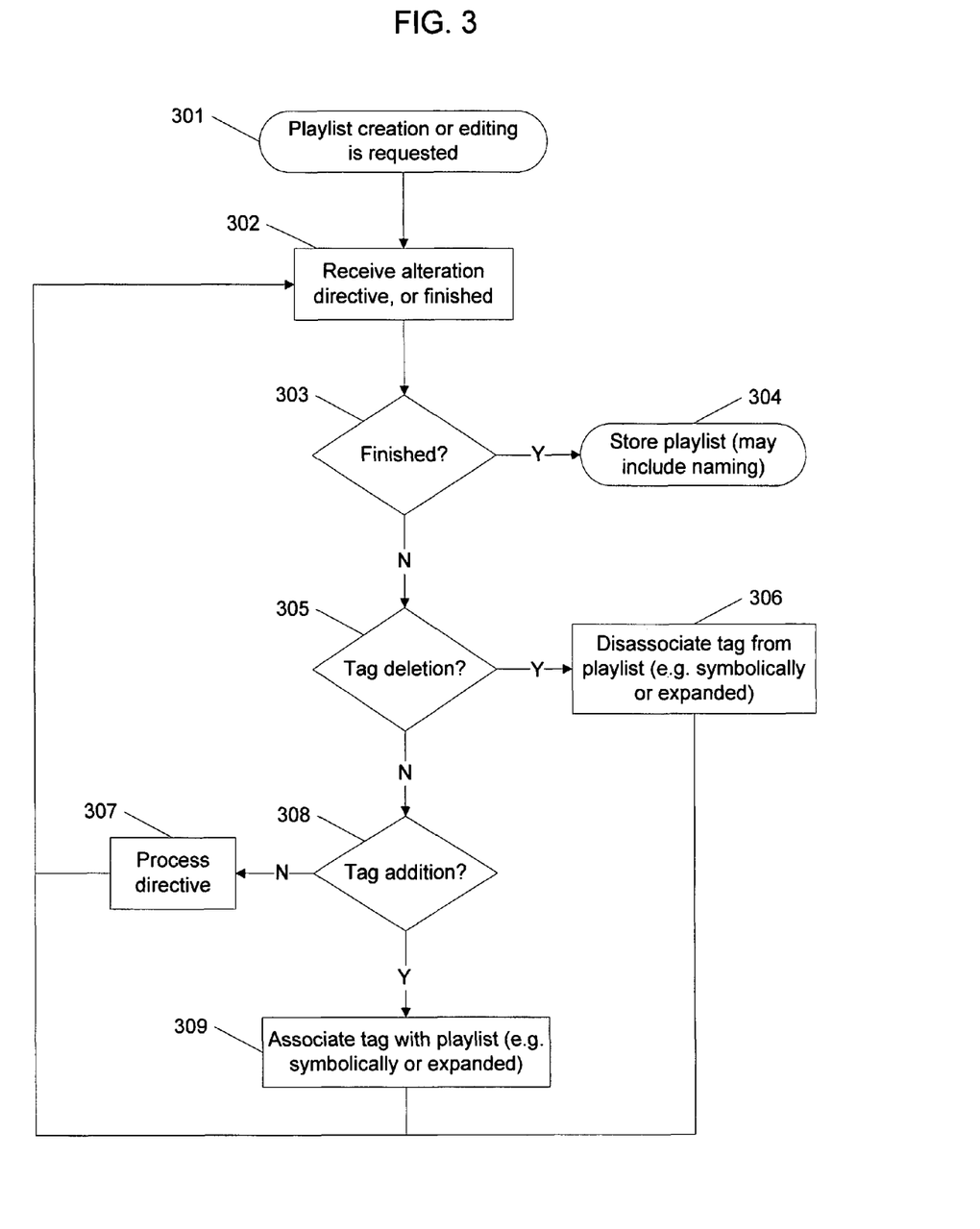
FIG. 3 is a flow diagram of a method for creating a playlist incorporating a tag, according to some embodiments.

FIG. 3 is a flow diagram of a method for creating or updating a playlist incorporating a tag, according to some embodiments. In this example, playlist creation or editing is requested (301). An example of receiving a request for playlist editing or creation is to receive a request to create or alter a playlist via a user interface or an HTTP request. In some embodiments, a playlist may be displayed in response to the request.

An directive to alter the playlist, or an indication that creation or alteration is finished, may be received (302).

It may be determined whether editing is finished (303). If it is determined that editing is finished (303), then in this example the playlist is stored (304). An example of storing the playlist is to store it in a playlist store such as playlist store 108 of FIG. 1. In some embodiments, the playlist may be named prior to storing it. In some embodiments, for example when a playlist consists of a single tag, the name of the tag may be used as the name of the playlist. In some embodiments, a separate input may be used as the name of the playlist, for example via a user interface element such as a textbox. In some embodiments, only alteration(s) made to the playlist during editing may be stored.

If it is determined that editing is not finished (303), then in this example it may be determined whether the directive is associated with a tag deletion (305). If so (305), then in this example a specified tag is disassociated from the playlist (306). One example of disassociating a tag from the playlist is to symbolically remove the tag from the playlist, e.g. to remove an identifier associated with the tag from a data structure such as a database table or an in-memory data structure (such as an array or a hash table) associated with the playlist. Another example of disassociating a tag from the playlist is to do so in an expanded mode, e.g. to determine the set of media elements associated with the tag and remove them from the playlist. In some embodiments, such expanded media elements associated with the tag to be removed may be kept on the playlist if they are separately on the playlist due to their belonging in the playlist for a separate reason, such as also having been tagged with a different tag associated with the playlist, or having been otherwise added to the playlist. Another directive to alter the playlist, or an indication that alterations are finished, may be received (302).

If it is determined that the directive is not associated with a tag deletion (305), then in this example it may be determined whether the directive is associated with a tag addition (308). If not, then in this example the directive is processed (307). One example of processing the directive is to add an individual media element to the playlist. Another example of processing the directive is to remove an individual media element from the playlist. Another example of processing the directive is to rename the playlist. Another example of processing the directive is to add or remove one or more media elements associated with an artist, album, or genre. Another example of processing the directive is to reorder the playlist. Another directive to alter the playlist, or an indication that alterations are finished, may be received (302).

If it is determined that the directive is associated with a tag addition (308), then in this example the tag is associated with the playlist (309). One example of associating a tag with a playlist is to symbolically associate the tag with the playlist, e.g. to add an identifier associated with the tag to a data structure such as a database table or an in-memory data structure associated with the playlist. Another example of associating a tag with the playlist is to do so in an expanded mode, e.g. to determine a set of one or more media elements associated with the tag and add them to the playlist. In some embodiments, such an addition may only add media element(s) that are not already associated with the playlist. Another directive to alter the playlist, or an indication that alterations are finished, may be received (302).

Figure 4:
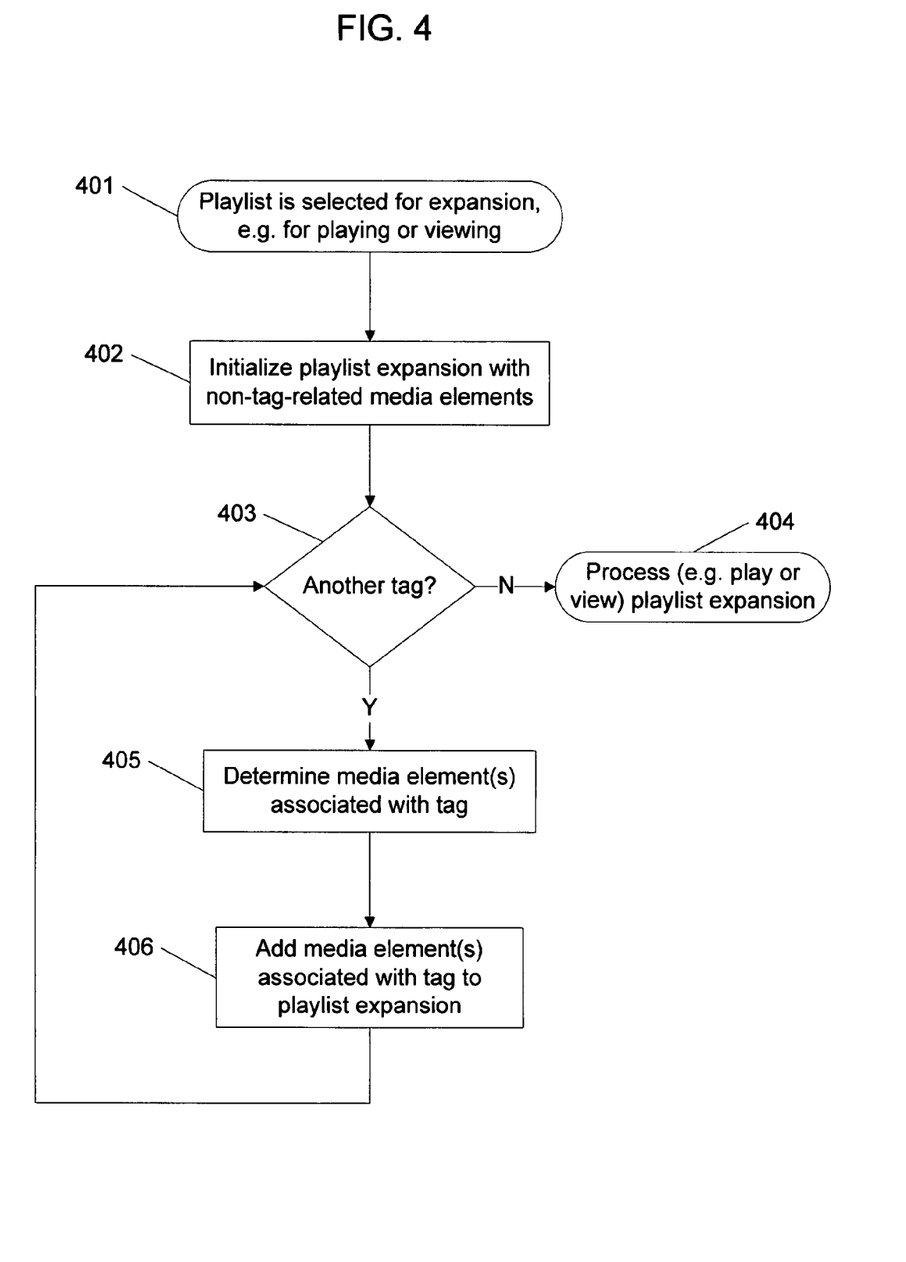
FIG. 4 is a flow diagram of a method for expanding a playlist including one or more tags, according to some embodiments.

FIG. 4 is a flow diagram of a method for expanding a playlist including one or more tags, according to some embodiments. In this example, a playlist is selected for expansion (401). One example of a reason a playlist may be selected for expansion is that it is to be viewed. Another example of a reason a playlist may be selected for expansion is that it is to be played. Another example of a reason a playlist may be selected for expansion is that it is to be synchronized with another device.

A playlist expansion may be initialized with zero or more media elements associated with the playlist that are not tag-related (402). A playlist expansion refers herein to a data structure such as a list containing an enumeration of media elements associated with a playlist. Examples of media elements associated with the playlist that are not tag-related include media elements that have been individually added to the playlist, and/or that have been added as a group other than using tags, such as media elements associated with an artist, album, or genre.

It may be determined whether there is another tag associated with the playlist that has not yet been expanded (403). If not, then in this example the playlist is processed (404). One example of processing the playlist is to provide media elements associated for the playlist for viewing. Another example of processing the playlist is to play one or more media elements associated with the expansion, for example all of the media elements sequentially. Playing a media element refers herein to presenting the media element, such as a video or music, and may include decoding digitally encoded video and/or audio, and/or checking digital rights management compliance. Such operations are well known to those skilled in the art.

If it is determined that there is another tag associated with the playlist that has not yet been expanded (403), then in this example zero or more media elements associated with the tag are determined (405). For example, the tag or an identifier associated therewith may be used as a key in a data structure such as a hash table, array or database table, and zero or more associated media elements may be retrieved.

The media element or elements, if any, associated with the tag may be added to the playlist expansion (406). An example of adding the elements to the playlist expansion is to append the elements to the end of the playlist expansion. In some embodiments, another ordering may be imposed, such as an alphabetical or user-defined ordering. In some embodiments, adding to the playlist expansion may be idempotent, avoiding duplicates. For example, if a media element associated with the tag is already associated with the playlist expansion, it may not be added an additional time. It may be determined whether there is another tag associated with the playlist that has not yet been expanded (403).

In some embodiments, expansion of a playlist as described in conjunction with this FIG. 4 may be performed dynamically in conjunction with processing the playlist expansion. For example, the next media element or elements may be determined incrementally as needed for processing.

Figure 5:
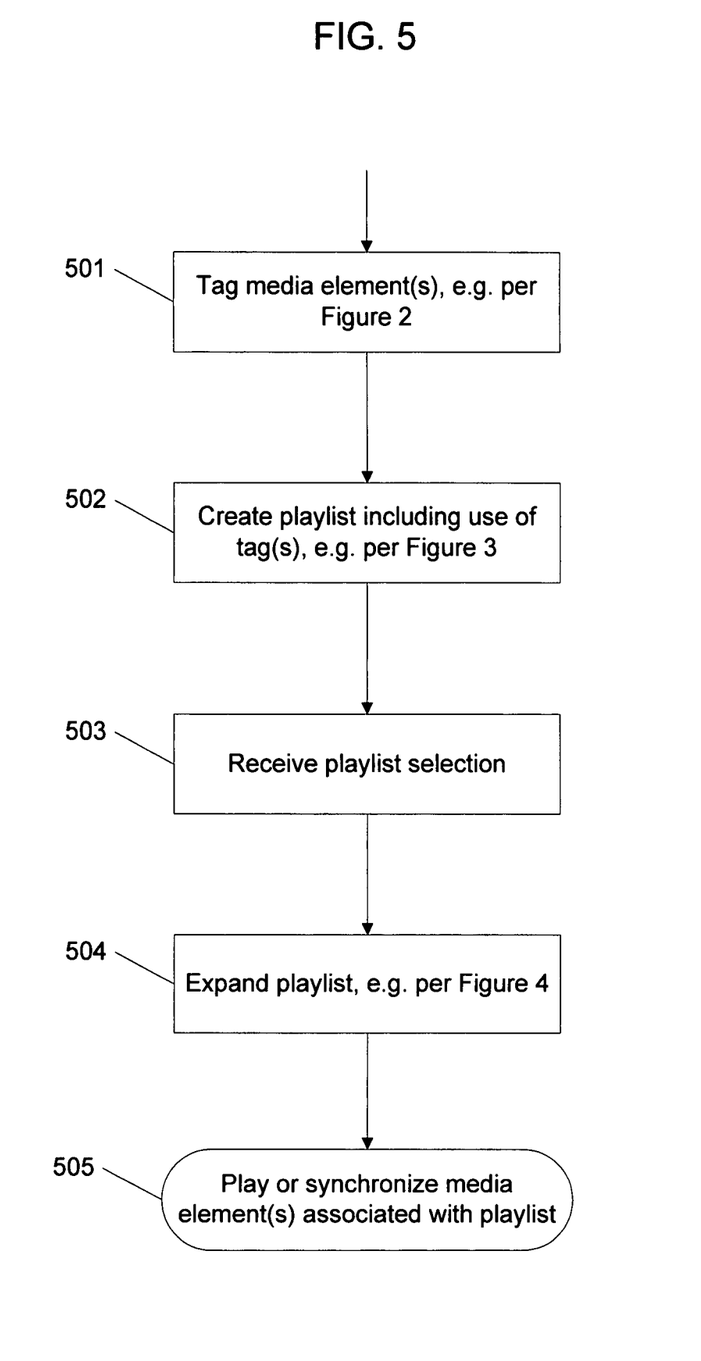
FIG. 5 is a flow diagram of a method for tag-based playlist processing, according to some embodiments.

FIG. 5 is a flow diagram of a method for tag-based playlist processing, according to some embodiments. In this example, one or more media elements are tagged, for example as discussed in conjunction with FIG. 2.

A playlist may be created using one or more tag (502), for example as discussed in conjunction with FIG. 3.

A selection of a playlist may be received (503). An example of receiving a playlist selection is to receive an indication of a selected playlist from a user interface. An example of a playlist selection is a selection of a user interface element associated with a playlist, such as a click or double-click on the name of the playlist, or an icon relating to the playlist, and/or a selection user interface element such as a button, checkbox or radio button associated with the playlist, or while the playlist is selected. Another example of a receiving a playlist selection is to receive an indication of a selected playlist from a software component such as a playlist sequencer that may play multiple successive playlists.

The selected playlist may be expanded (504), for example as discussed in conjunction with FIG. 4.

One or more media elements associated with the playlist may be played or synchronized (505), for example in an order associated with the playlist, or in a pseudorandom order.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a playlist, comprising:
receiving a first tag, wherein the first tag is a first text string that has been input by a user;
receiving a directive to associate the first tag with a playlist;
responsive to receiving the directive to associate the first tag with a playlist, associating the first tag with the playlist;
receiving a directive to associate the first tag with a first media element;
responsive to receiving the directive to associate the first tag with the first media element, associating the first tag with the first media element;
receiving a directive to associate the first tag with a second media element;
responsive to receiving the directive to associate the first tag with the second media element, associating the first tag with the second media element;
creating a playlist expansion for the playlist, wherein creating the playlist expansion for the playlist includes determining a plurality of tags associated with the playlist, wherein the plurality of tags associated with the playlist includes the first tag and a second tag, wherein the second tag is associated with the first media element, determining a plurality of media elements associated with the second tag, wherein the plurality of media elements associated with the second tag includes the first media element adding the plurality of media elements associated with the second tag to the playlist expansion, determining a plurality of tags associated with the first tag, wherein the plurality of media elements associated with the first tag includes the first media element and the second media element, determining that the first media element is already in the playlist expansion, determining that the second media element is not already in the playlist expansion, and responsive to determining that the first media element is already in the playlist expansion and that the second media element is not already in the playlist expansion, adding the second media element, but not the first media element, to the playlist expansion;
determining a selected media element, wherein the selected media element is in the playlist expansion, and wherein the selected media element is one of the first media element and the second media element; and
processing the selected media element.

2. The method of claim 1, wherein the selected media element is associated with audio.

3. The method of claim 1, wherein the selected media element is associated with video.

4. The method of claim 1, performed by a portable media player.

5. The method of claim 1, performed by a personal computer.

6. The method of claim 1, wherein receiving the first tag includes receiving the first text string as a typed input from the user.

7. The method of claim 1, wherein receiving the first tag includes receiving the first tag from a social tagging service.

8. The method of claim 1, further comprising determining a second selected media element, wherein the second selected media element is different than the selected media element and wherein the second selected media element is one of the first media element and the second media element, and processing the second selected media element.

9. The method of claim 1, wherein processing the selected media element includes playing the media element.

10. The method of claim 1, wherein processing the selected media element includes synchronizing the media element.

11. A system for processing a playlist, comprising:
a processor configured to:
receive a first tag, wherein the first tag is a first text string that has been input by a user;
receiving a directive to associate the first tag with a playlist;
responsive to receiving the directive to associate the first tag with a playlist, associate the first tag with the playlist;
receive a directive to associate the first tag with a first media element;
responsive to receiving the directive to associate the first tag with the first media element, associate the first tag with the first media element;
receive a directive to associate the first tag with a second media element;
responsive to receiving the directive to associate the first tag with the second media element, associate the first tag with the second media element;
create a playlist expansion for the playlist, wherein creating the playlist expansion for the playlist includes determining a plurality of tags associated with the playlist, wherein the plurality of tags associated with the playlist includes the first tag and a second tag, wherein the second tag is associated with the first media element, determining a plurality of media elements associated with the second tag, wherein the plurality of media elements associated with the second tag includes the first media element adding the plurality of media elements associated with the second tag to the playlist expansion, determining a plurality of tags associated with the first tag, wherein the plurality media elements associated with the first tag includes the first media element and the second media element, determining that the first media element is already in the playlist expansion, determining that the second media element is not already in the playlist expansion, and responsive to determining that the first media element is already in the playlist expansion and that the second media element is not already in the playlist expansion, adding the second media element, but not the first media element, to the playlist expansion;

determine a selected media element, wherein the selected media element is in the playlist expansion, and wherein the selected media element is one of the first media element and the second media element; and process the selected media element; and a memory coupled with the processor, wherein the memory provides instructions to the processor.

12. A computer program product for processing a playlist, the computer program product being embodied in a non-transitory computer readable medium and comprising computer instructions for:

receiving a first tag, wherein the first tag is a first text string that has been input by a user;

receiving a directive to associate the first tag with a playlist;

responsive to receiving the directive to associate the first tag with a playlist, associating the first tag with the playlist;

receiving a directive to associate the first tag with a first media element;

responsive to receiving the directive to associate the first tag with the first media element, associating the first tag with the first media element;

receiving a directive to associate the first tag with a second media element;

responsive to receiving the directive to associate the first tag with the second media element, associating the first tag with the second media element;

creating a playlist expansion for the playlist, wherein creating the playlist expansion for the playlist includes determining a plurality of tags associated with the playlist, wherein the plurality of tags associated with the playlist includes the first tag and a second tag, wherein the second tag is associated with the first media element, determining a plurality of media elements associated with the second tag, wherein the plurality of media elements associated with the second tag includes the first media element adding the plurality of media elements associated with the second tag to the playlist expansion, determining a plurality of tags associated with the first tag, wherein the plurality of media elements associated with the first tag includes the first media element and the second media element, determining that the first media element is already in the playlist expansion, determining that the second media element is not already in the playlist expansion, and responsive to determining that the first media element is already in the playlist expansion and that the second media element is not already in the playlist expansion, adding the second media element, but not the first media element, to the playlist expansion;

determining a selected media element, wherein the selected media element is in the playlist expansion, and wherein the selected media element is one of the first media element and the second media element; and processing the selected media element.

13. The computer program product of claim 12, wherein the selected media element is associated with audio.

14. The computer program product of claim 12, wherein the selected media element is associated with video.

15. The system of claim 11, wherein the processor is a component of a portable media player.

16. The system of claim 11, wherein the processor is a component of by a personal computer.

17. The computer program product of claim 12, wherein receiving the first tag includes receiving the first text string as a typed input from the user.

18. The computer program product of claim 12, further comprising computer instructions for determining a second selected media element, wherein the second selected media element is different than the selected media element and wherein the second selected media element is one of the first media element and the second media element, and processing the second selected media element.

19. The method of claim 8, wherein processing the first selected media element and the second selected media element includes playing the first selected media element and the second selected media element, and wherein playing the first selected media element and the second selected media element is performed in a random order.

20. The method of claim 1, wherein the playlist expansion for the playlist is created dynamically.

* * * * *